Jan. 2, 1962   J. S. BATES   3,015,510
PIPE SEALING GASKET
Filed Dec. 12, 1956

INVENTOR
JOHN S. BATES
BY Henry N. Young
ATTORNEY

United States Patent Office 3,015,510
Patented Jan. 2, 1962

3,015,510
PIPE SEALING GASKET
John Schuyler Bates, Berkeley, Calif., assignor by decree of distribution of seventy percent to Kenton Schuyler Bates, and of fifteen percent to Robert Brent Bates, and of fifteen percent to Margaret Elizabeth Bates Trotter
Filed Dec. 12, 1956, Ser. No. 627,845
2 Claims. (Cl. 288—23)

The invention relates to a sealing gasket for a pipe joint of the bell-and-spigot type.

In providing sealed joints for pipe sections of the bell-and-spigot type, and including sewer pipes of vitrified clay or of other materials, it is usually essential that the jointure provided remain sealed for a long period of time, particularly for underground installations. The traditional manner of sealing such joints comprises the use of fibrous materials, mastic compounds or cement, which, from one cause or another, generally result in leaky joints. It is, accordingly, a general purpose of the present invention to provide a pre-formed liquid-tight sealing ring for such pipe joints for effecting an enduring and complete seal thereat.

The main object is to provide an automatically centered pipe joint seal which prevents infiltration of water under external pressure into a joint.

Another object of the invention is to provide a pipe sealing gasket of the character described which may provide a maintained seal between connected pipe sections initially or subsequently aligned or misaligned in a pipeline.

A further object is to provide a pipe joint which is fully sealed outwardly of the bores of the joined pipes, whereby to prevent an accumulation of sewage material within the joint.

An added object is to provide a pipe-sealing gasket which may be successfully applied to provide pipe jointures in underwater locations.

The invention possesses other objects and features of advantage, some of which, with the foregoing, will be set forth or be apparent in the following description of a typical embodiment thereof, and in the accompanying drawings, in which, FIGURE 1 is a fragmentary side and partly sectional view of the bell end of a pipe section with which the present gasket is adapted to be used.

Figure 5:
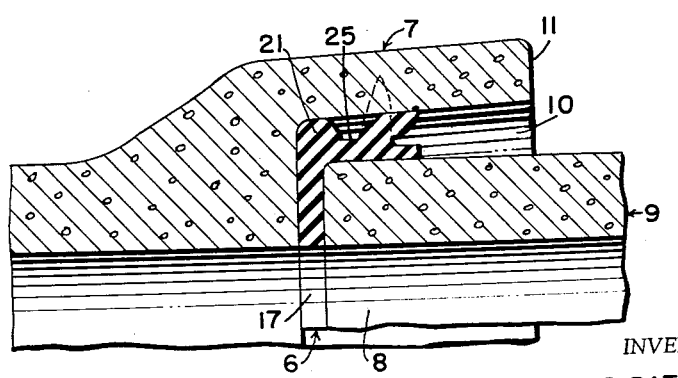
FIGURE 5 is an enlarged fragmentary section showing a completed pipe jointure utilizing the present sealing gasket.

As particularly illustrated in FIGURE 5, a one-piece gasket 6 of my invention is shown as provided and installed for effecting a sealed connection between the bell and spigot portions 7 and 8 provided respectively at opposite ends of vitrified sewer-pipe sections 9 having an expanded bell portion 7 of one section arranged for receiving the unexpanded spigot portion 8 of an adjacent pipe section of like size. As is usual, the bell end portion 7 of a pipe section 9 provides an inwardly tapering bore 10 extending from a flat outer bell end face 11 and terminating at a flat shoulder 12 opposite which the annular free end 13 of the pipe spigot 8 is arranged to be disposed in a sealed jointure of the engaged pipe sections, it being understood that the bores 14 of the pipe sections 9 are alike and uniform. As indicated, the pipe sections 9 are of vitrified clay, but it will be understood that they might be of metal or of other materials depending on the pipe size and intended use. Recalling that bell-and-spigot pipe sections are commonly provided for different pipe sizes, it will be understood that gaskets 6 of different appropriate sizes would be provided for sealing use at the jointures thereof.

It will now be noted that a present sealing gasket 6 is of generally annular form having a tubular body portion 16 having its bore 16' arranged by stretching to snugly and sealedly receive and frictionally retain therein a pipe spigot portion 8 adjacent its end face 13. At one end thereof, the gasket body portion 16 is provided with an inwardly directed flange 17 of uniform thickness axially of the gasket, and said flange is arranged to fittedly engage flat against the spigot end face 13 when the gasket is mounted thereon, whereby to hold the present gasket 6 firmly in place without slipping during insertion of spigot 8 carrying the gasket 6 in the bell 7.

When a spigot carrying a present gasket 6 is engaged in a bell 7 to the limit imposed by the gasket flange 17, as is shown in FIGURE 5, said flange 17 is arranged to occupy the annular space defined between the opposed end face 13 of the spigot and the shoulder 12 at the inner end of the socket of the bell portion 7. Such a filling of the space between said shoulder and face of the flange 17 of the gasket 6 is, by reason of the yielding fitting of the flange between said shoulder and face, arranged to more or less seal said space within the bell to prevent an accumulating therein of sewage or other materials in the pipeline which might, by either bacteriological or chemical action, produce deleterious effects in the sewage being conveyed through the pipeline. For best serving its foregoing purpose while avoiding interference with the flow of material through the pipeline bore, the flange 17 should, as shown, have its stretched bore 18 of the same size as the bore 14 of the joined pipe sections.

At the flanged end thereof, the gasket portion 16 is provided with an outwardly extending portion 21 opposite the flange 17, said portion comprising a uniform periphered bead being shown as having a width axially of the gasket part 16 which somewhat exceeds the thickness of the flange 17. Intermediately thereof, and spaced rearwardly from the bead 21, the tubular portion 16 of the gasket 6 is provided with a continuous radially extending sealing flange or fin 22 of uniform generally triangular cross-section having a radial face 23 at its side which is closest to the open end of the tubular portion 16 of the gasket 6 and rounding to a sharp edge at the periphery of its other exposed face 24 which extends angularly from the fin periphery toward the base of the bead portion 21 to provide one side of a circumferential groove 25 defined thereat. The sealing fin 22 has a circular peripheral edge having a circumference which appreciably exceeds that of the outer end of the bell bore 10, when the gasket is mounted as shown on a pipe spigot end 8, while the peripheral circumference of the bead 21 is at least, and may slightly exceed, that at the inner end of the bore 10, whereby it may snugly fit the corner provided at the juncture of the bore 10 and the shoulder 12 of a bell end 9.

It will now be particularly noted that a present gasket 6 preferably and most conveniently comprises a molded unit of homogeneous and resiliently yielding structure throughout, and is formed of a composition having certain desired or required physical qualities for its purposes. The material of the gasket unit 6 preferably comprises a molded stretchable rubber composition, or some other physically similar liquid-impervious material, having an intermediate degree of hardness approximating the range of forty to sixty on the durometer hardness scale, it being understood that the gasket material must not be subject to deterioration by the action thereon of materials to be conveyed through a pipeline sealed by the gasket which must also be circumferentially stretchable to sealedly engage a spigot portion 8 in its bore 16' without a fracturing or permanent deforming of its structure. Furthermore, the radial sealing flange or fin 22 of the gasket 6 must be rearwardly deflectable toward the exterior of the integrally associated portion 16 by its engagement with the bore 10 of a receiving pipe bell without fracturing or permanently deforming its initial structure, whereby it may provide a pressure-maintained sealed engagement of its face 24 with the engaged bell bore.

Figure 1:
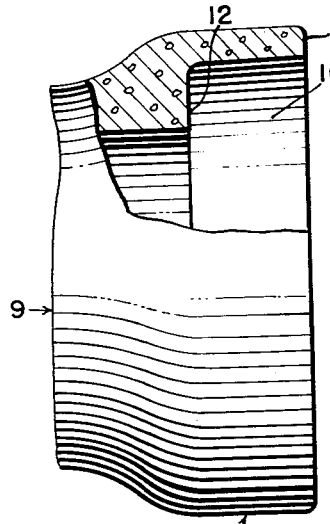
Figure 2:
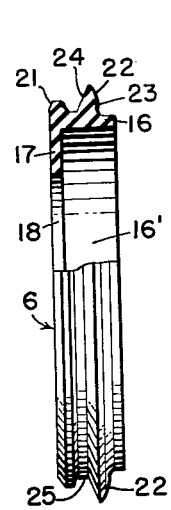
FIGURE 2 is a partly sectional edge view of the unmounted gasket as disposed in opposed coaxial alignment with the pipe section bell of FIGURE 1.
Figure 3:
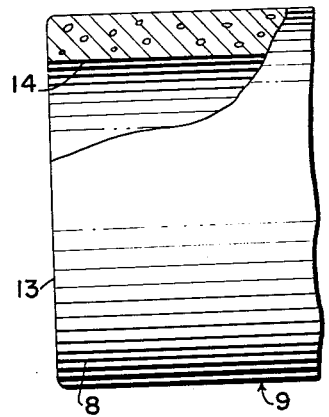
FIGURE 3 is a fragmentary side and partly sectional view of a pipe-section spigot end to be sealedly installed in the pipe section bell of FIGURE 1.
Figure 4:
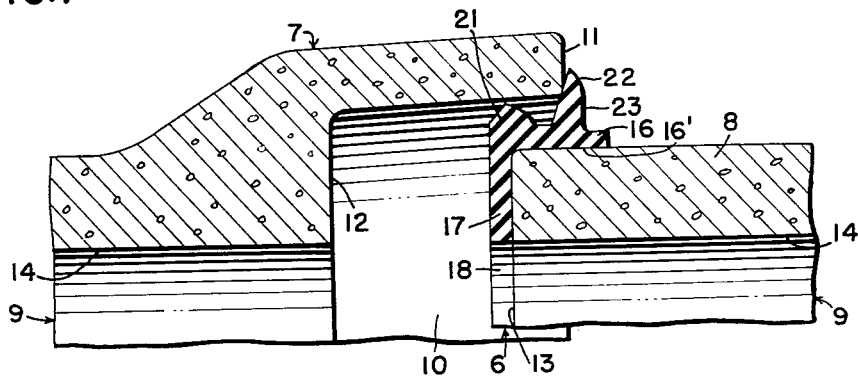
FIGURE 4 is an enlarged fragmentary section showing the sealing gasket as mounted on the end of a pipe section spigot and having an external sealing flange or fin of the gasket engaged against the outer end of the opposed bell of an adjacent pipe section in the bell.

In providing a pipeline jointure by the use of a present gasket 6, the gasket is first stretchedly mounted on the forward end portion of a pipe spigot 8 with its end flange 17 engaged flat against the opposed spigot end face 13, and the gasket-carrying spigot end is then advanced generally axially toward and into the socket of a bell portion 7 of a pipe section 9 to finally engage the flange 17 with the shoulder 12 of the bell portion; with the gasket so mounted on the spigot, it is positively pushed by the spigot into a receiving pipe socket. As the gasket-carrying spigot portion 8 of one pipe section is moved generally axially into the opposed socket of a fixedly positioned adjacent pipe section, or a bell socket of one section is advanced about the spigot of a fixedly positioned adjacent pipe section, the permitted free passage of the forward bead portion 21 of the mounted gasket into the bore 10 of the bell portion is arranged to provide a preliminary centering of the gasket and spigot in the outer end of the bell bore 10 until the forward face 24 of the gasket fin 22 axially engages the bell end face 11 at its inner edge (see FIGURE 4).

A subsequent forcing of the gasket-carrying spigot into the bell socket by a suitable application of the necessary force at the rear end of the pipe section being installed by moving it toward the other relatively fixed pipe section, is arranged to finally, and more or less sealedly, engage the end gasket flange 17 with the shoulder 12 at the inner end of the bell socket, while the centering bead 21 engages in the corner at the outer edge of the shoulder. Simultaneously, the fin 22 is deflected rearwardly in engagement with the bell bore 10 to provide a wedged pressure-sealed engagement of the forward fin face 24 with said bore, it being understood that the gasket face portions engaging the shoulder and bore of the pipe bell portion 7 are soft enough to yieldingly fit about usual surface irregularities found in faces of molded or cast pipe sections. Furthermore, the transverse flexibility of the fin 22 permits its full sealing function in any radially irregular annular spaces defined between opposed out-of-round or irregular surfaces of socket bores and received spigots. It is also important to note that the groove 25 defined between the bases of the bead 21 and sealing fin 22 essentially functions to provide a space for fully receiving the adjacent outwardly lifted gasket portion at the base of the bent-over fin and so protects the fin from damage by undue compressional or tensional strains around its base.

Since the seals respectively provided by the spigot exterior and bell bore provide the primary seal for a present jointure, it will be noted that the joined sealed-together pipe sections need not, by reason of the flexibility of the installed gasket, be coaxial, whereby the seal is fully effected even if the sections are angularly related while a more or less full secondary seal is being provided at the gasket flange 17. It is therefore to be understood that the flexible seal jointure provided by an installed gasket 6 is maintained during changes in the angular relation of pipeline sections due to any subsequent line-bending conditions, as a back fill settling shifting of the earth at the pipeline. Furthermore, because of the liquid-impervious and one-piece structure of a present gasket 6 and the provision for its operative installation between pipe sections while non-shiftably mounted on a spigot end, a present bell-and-spigot jointure may be provided while the pipe sections are partly or fully submerged in water, or another liquid, whereby the continued laying of a pipeline is not prevented thereby. Also, any bell space remaining rearwardly of the installed gasket 6 of a completed present jointure may, if desired, be filled with a mastic, or other suitable material, solely to prevent the intrusion of soil or water or other extraneous matter into such space, it being understood that the sharp edge of the fin 22 is arranged to sealedly engage the fin with the engaged socket bore against the pressure entry of ground water or other external liquid between the fin and the bore.

From the foregoing description taken in connection with the accompanying drawings, the advantages of the present pipe-sealing gasket will be readily understood by those skilled in the art to which the invention appertains. While I have shown and described a structure and arrangement which I now consider to be a preferred embodiment of my invention, I desire to have it understood that the showings are primarily illustrative, and that such changes and developments may be made, when desired, as fall within the scope of the following claims.

I claim:

1. In a gasket unit particularly adapted for sealing a pipe joint of the bell-and-spigot type, a homogeneous body of resiliently flexible liquid-impervious material having a tubular portion arranged for its fixed and radially stretched mounting directly on and about the spigot end of a pipe section in sealed contact therewith and providing an outwardly-extending uniform annular bead portion at its forward end and arranged for its spigot-centering engagement within the bore of a spigot-receiving pipe bell to internally seal the passage between the bell bore and the exterior of the tubular body portion, and a continuous uniform integral sealing-fin body portion of triangular cross-section spaced rearwardly from said bead portion to define a peripheral annular groove between it and said bead and extending radially outwardly said tubular body portion to a sharpened peripheral edge, said radial fin portion of the body being rearwardly deflectable by and within the bore of a receiving pipe bell of a connected pipe section to externally seal the passage between the bell bore and the spigot thereat at an area bounded by said fin edge by reason of the insertion of the gasket in the bell with the mounting spigot, the space of said groove being arranged to fully receive the portion of the tubular body portion which is displaced by the sealing deflection of the fin.

2. In a gasket unit particularly adapted for sealing a pipe joint of the bell-and-spigot type, a homogeneous body of resiliently flexible liquid-impervious material having a tubular portion arranged for its fixed and radially stretched mounting directly on and about the spigot end of a pipe section in sealed contact therewith and providing an outwardly-extending uniform annular bead portion at its forward end and arranged for its spigot-centering engagement within the bore of a spigot-receiving pipe bell to internally seal the passage between the bell bore and the exterior of the tubular body portion, an inwardly-extending annular flange of the body having its forward face coplanar with the forward face of said bead and having its rearward face engageable with the opposed end of the mounting spigot as a positioning stop for the mounting of the gasket unit on the engaged spigot end and arranged to occupy the space between the opposed spigot end and the inner end of the bell socket when the sections are joined, a continuous uniform integral sealing-fin body portion of triangular cross-section spaced rearwardly from said bead portion to define a peripheral annular groove between it and said bead and extending radially outwardly about said tubular body portion to a sharpened peripheral edge, said radial fin portion of the body being rearwardly deflectable by and within the bore of a receiving pipe bell of a connected pipe section to externally seal the passage between the bell bore and the spigot thereat at a line including said fin edge by reason of the insertion of the gasket in the bell with the mounting spigot, the space of said groove being arranged to fully receive the portion of the tubular body portion which is displaced by the sealing deflection of the fin.

References Cited in the file of this patent

UNITED STATES PATENTS

| | | |
|---|---|---|
| 2,116,705 | Marx et al. | May 10, 1938 |
| 2,271,777 | Nathan | Feb. 3, 1942 |
| 2,280,183 | Bennett | Apr. 21, 1942 |
| 2,314,386 | Brend | Mar. 23, 1943 |
| 2,321,411 | Morse | June 8, 1943 |
| 2,561,884 | Perrow | July 24, 1951 |
| 2,615,740 | Nathan | Oct. 28, 1952 |
| 2,722,438 | Kennison | Nov. 1, 1955 |
| 2,726,103 | Slattery | Dec. 6, 1955 |

FOREIGN PATENTS

| | | |
|---|---|---|
| 75,978 | Denmark | June 1, 1953 |